United States Patent [19]
Valentine et al.

[11] Patent Number: 5,132,176
[45] Date of Patent: Jul. 21, 1992

[54] BATTERY STATE OF CHARGE INDICATOR

[75] Inventors: Theodore W. Valentine; Allen F. Fiedler, both of Lisle, Ill.; Joseph Szymborski, Warrensburg, Mo.; Mark L. Eggers, Schaumburg, Ill.

[73] Assignee: GNB Industrial Battery Company, Lombard, Ill.

[21] Appl. No.: 518,181

[22] Filed: May 3, 1990

[51] Int. Cl.$^5$ .............................. H01M 10/48
[52] U.S. Cl. .......................... 429/91; 429/54
[58] Field of Search ........................ 429/91, 54

[56] References Cited

U.S. PATENT DOCUMENTS 2,331,450 10/1943 Baum .

FOREIGN PATENT DOCUMENTS

479990 7/1929 Fed. Rep. of Germany .
498287 5/1930 Fed. Rep. of Germany .
970094 12/1950 France .
0025699 2/1966 Japan .............................. 429/91
741257 11/1955 United Kingdom .

Primary Examiner—Brian E. Hearn
Assistant Examiner—M. Nuzzolillo
Attorney, Agent, or Firm—Leydig, Voit & Mayer

[57] ABSTRACT

In combination with an electric storage battery having a container and a cover, and having a plurality of walls for enclosing the electrolyte and other electrochemical components of the battery, a state of charge indicating device for monitoring the concentration of the electrolyte during the charge and discharge cycles of the battery. The indicating device is made of a porous solid support and an acid concentration sensitive dye which exhibits a change in color in accordance with the acid concentration of the electrolyte. The indicating device also includes a viewport located in one of the walls of the battery for viewing the color of the dye. The color may then be correlated to a reference scale to determine the state of charge of the battery.

27 Claims, 2 Drawing Sheets

FIG. 8

BATTERY STATE OF CHARGE INDICATOR

FIELD OF THE INVENTION

The present invention relates generally to batteries, and more particularly to a state of charge/discharge indicator for lead-acid batteries.

BACKGROUND OF THE INVENTION

A number of methods have been developed to determine the state of charge of batteries or individual battery cells. One method commonly used in connection with flooded or excess electrolyte batteries is the measurement of the specific gravity of the electrolyte. Such a measurement is accomplished by the use of a hydrometer which may be situated inside the battery itself. A manual hydrometer can also be used to measure the specific gravity of the electrolyte, and thus determine the state of charge. Use of a manual hydrometer, however, normally requires that the battery be disconnected and that a significant quantity of electrolyte be removed through a battery fill cap or other opening. This may result in electrolyte spillage and time-consuming clean-up operations. Because a hydrometer requires free electrolyte, a hydrometer cannot be used in starved electrolyte batteries, which contain no free electrolyte, or in sealed, maintenance-free, lead-acid batteries.

Various electronic devices are also frequently used to measure the state of charge of battery cells. Although such devices are generally reliable, they are often quite expensive. Electronic state of charge indicators generally measure variables such as the open-circuit voltage of the battery, or the voltage under load. These measurements are then compared with a reference scale to determine the state of charge of the battery. The operation of these electronic devices may require the use of an external power source, or the battery cell itself may supply the power to monitor the state of charge. This latter arrangement, however, contributes to cell discharge.

The state of charge of a battery may also be determined in relation to the differential swelling of dissimilar plastic materials placed within the battery. Such materials swell due to the vapor pressure of the air in the headspace above the electrolyte, causing a dimensional difference between the dissimilar materials. This differential can be measured and used to determine the state of charge of the battery. Indicating devices made of dissimilar materials, however, are generally sensitive to temperature and movement, and are therefore often unreliable as a result of hysteresis.

Other devices used to indicate the state of charge of a battery include various types of color-coded display systems. For example, a cell may contain an indicating device made of litmus paper which changes color in response to a change in the pH of the free electrolyte, thereby indicating a change in the state of charge. Color-coded charge indication systems are typically designed and located within the battery so that the litmus paper is in direct contact with the electrolyte. Such indicating devices are generally located adjacent to or in the walls of the battery container, and often include a window so that color changes in the litmus paper are visible and may be compared with a reference scale.

OBJECTS OF THE INVENTION

It is a primary aim of this invention to provide a battery state of charge indicating device that may be positioned in the cover, side wall or end wall of the battery to facilitate convenient reading. This permits the battery to be easily monitored when warehoused and, once in use, to be monitored without resort to separate testing apparatus or an external power source.

It is a more specific object to provide an indicating device that may be used in various types of batteries in which the electrolyte changes in concentration. A related object is to provide an indicating device that is not position sensitive. Yet another object is to provide an indicating device which is useful in a flooded or excess electrolyte battery, or an absorbed electrolyte battery.

An additional object is to provide a reliable, low-cost indicating device which responds readily to changes in the battery's acid concentration to provide a continuous indication of the state of charge of the battery. A further object is to provide a self-contained device that may be easily installed in the battery. Another object is to provide an indicating device that may be combined with other battery components to provide composite battery components to reduce the number of through-container fittings.

In accomplishing these objectives, the applicants provide a battery state of charge indicator which may be utilized in various locations within the battery. The preferred indicator employs a dye system which reversibly changes color in response to a change in the acid concentration of the electrolyte. The concentration of acid contained in the dye system reaches equilibrium with the concentration of acid in the electrolyte by an exchange of moisture with the vapor above the electrolyte or with the electrolyte itself. The change in color, which indicates the relative concentration of the electrolyte, may be observed through a viewport located on the outside surface of the battery container.

These and other features and advantages of the invention will be more readily apparent upon reading the following description of the invention and upon reference to the accompanying drawings.

SUMMARY OF THE INVENTION

The present invention is directed to the combination of an electric storage battery, comprising a container and a cover, and having a plurality of walls for enclosing the electrolyte and other electrochemical components of the battery, and a state of charge indicating device for monitoring the concentration of the electrolyte during the charge and discharge cycles of the battery. The indicating device comprises a porous solid support and a dye system, which is absorbed into the support. In accordance with the invention, the dye system contains acid, water, and at least one dye that is sensitive to changes in acid concentration. During the operation, the dye system either evaporates water vapor to or absorbs water from the atmosphere above the electrolyte or from the electrolyte directly. As the concentration of the acid contained within the dye system reaches equilibrium with the concentration of the acid in the electrolyte, the dye exhibits a corresponding change in color. The indicating device also includes a viewport located in one of the walls of the battery for viewing the color of the acid concentration sensitive dye. The color may then be correlated to a reference scale to determine the state of charge of the battery.

Preferred embodiments of the invention are specifically directed to a state of charge indicator that may be positioned in the cover or any of the walls of the battery container, and which may employ different dye systems. Other embodiments of the invention are directed to the combination of the indicating device and other battery components, such as a battery fill cap and pressure relief vent. While the present invention will be disclosed and discussed primarily in terms of those preferred embodiments, it is not intended to be limited thereto. Other modifications and embodiments will be apparent to those skilled in the art.

DETAILED DESCRIPTION OF THE PREFERRED EMBODIMENTS

Figure 1:
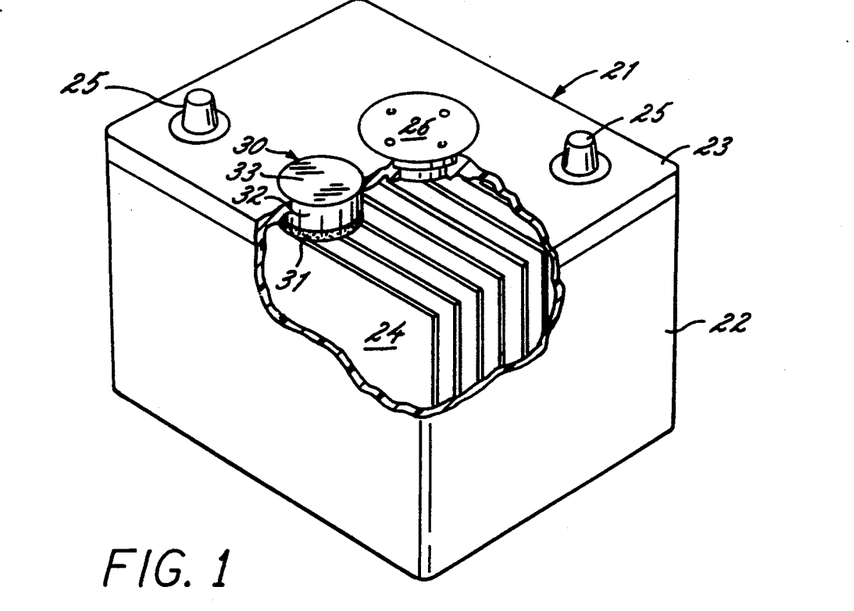
FIG. 1 is a perspective view of a preferred embodiment of a battery, partially cut away to show certain details of a state of charge indicator according to the present invention.

Turning now to the drawings, FIG. 1 shows an exemplary sealed lead-acid battery 21 having a container 22 with a cover 23. The battery shown in FIG. 1 has two top terminals, but regardless of the arrangement of the terminals, the electrochemical components of a sealed lead-acid battery may be set within a solid rectangular-shaped container which may house one or more cells, shown generally as 24. In a typical battery, the interior of the container is divided by partition walls into a series of cells, and within each cell an electrode stack is placed in contact with a liquid electrolyte.

The electrode stacks comprise alternating positive and negative plates, containing $PbO_2$ and $Pb$, respectively, and are connected in parallel by positive and negative conductive straps (not shown). The electrode stacks are generally connected in series by at least one intercell connection between the conductive straps. The conductive straps of each intercell group have one such intercell connection, although multiple intercell connections are possible. The conductive strap in each of the two end cells is a terminal conductive strap, and is, as the name implies, electrically connected to the positive and negative plates and the corresponding positive or negative battery terminal.

Turning again to FIG. 1, the battery shown therein comprises a generally rectangular shaped container 22 which is sealed to a cover 23. The particular configuration of the cover and the container is not considered critical; a wide variety of configurations have been propored in the art and may be utilized in the context of the present invention. In addition, a wide variety of thermoplastic resins and molding techniques are known and may be used to form the container and cover. Likewise, any of several known techniques for sealing the cover to the container may be used, e.g., heat sealing with or without adhesives, adhesives alone, or solvents. In addition to the terminals, the cover 23 of the battery of FIG. 1 contains a vent cap 26 through which the battery may be filled with electrolyte, and which includes means for releasing excess high pressure gas that may be developed within the battery container. As an example, a Bunsen-type valve may be used. McClelland U.S. Pat. No. 3,862,861 shows such a one-way valve.

During the discharge cycle of a lead acid battery, an electrochemical reaction results in the consumption of sulfuric acid and the production of water. The discharge reaction for the cell may be represented as follows:

$$Pb + PbO_2 + 2H_2SO_4 \rightarrow 2PbSO_4 + 2H_2O$$

During the charge cycle of a lead acid battery, an electrochemical reaction results in the production of lead, lead dioxide and sulphuric acid. The overall charge reaction for the positive and negative plates may be represented as follows:

$$2PbSO_4 + 2H_2O \rightarrow PbO_2 + Pb + 2H_2SO_4$$

In accordance with the invention, the battery 21 is provided with a state of charge indicator to monitor the state of the electrochemical potential of the battery 21. As a battery cell cycles, the concentration of the electrolyte changes. High concentration levels of acid indicate that the battery is in a charged state, while lower concentrations indicate that the battery is in a discharged state. This change in concentration may be monitored to determine the state of charge of the battery.

The state of charge indicator contains a dye system which comprises sulfuric acid and a dye that is sensitive to the concentration of acid contained in the indicator. According to an important aspect of the invention, the atmosphere within the closed battery container will reach a stable moisture content which is related to the concentration of the acid in the indicator and the acid in the electrolyte. Water will evaporate from the more dilute acid in either the indicator or the electrolyte and will be absorbed by the more concentrated acid until the concentrations in both acid solutions are at equilibrium. As the dye is sensitive to the acid concentration in the indicators, the dye system will display a predictable color which corresponds to the acid concentration in the indicator, and therefore the acid concentration of the electrolyte in the cell. The color of the dye may be observed from the exterior of the battery through a viewport, where the color can be compared with a reference scale to determine the state of charge of the battery.

As the acid concentrations in the indicator and the electrolyte reach equilibrium, changes in the acid concentration of the electrolyte due to charging or discharging of the battery will be reflected by a change in the color displayed by the dye system. When the battery discharges, sulfuric acid is consumed and water is produced, and the moisture content of the atmosphere above the electrolyte will increase as the acid concentration decreases. Conversely, as a battery is charged, water is consumed and acid is produced. As a result, the moisture content of the atmosphere will decrease as the acid concentration of the electrolyte increases during charging. As the acid concentration confined in the indicator reaches equilibrium with the acid concentration in the electrolyte, the dye exhibits a corresponding color change. When compared to the reference scale, the color change will indicate the state of charge of the battery.

Figure 2:
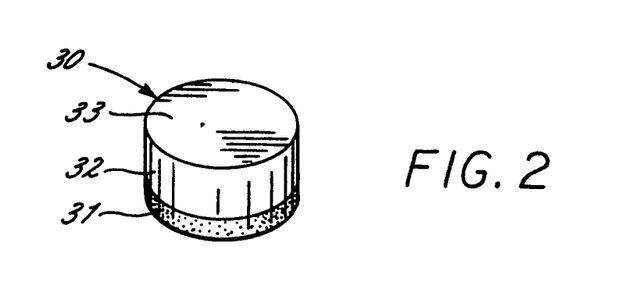
FIG. 2 is a perspective view of the state of charge indicator shown in FIG. 1.
Figure 3:
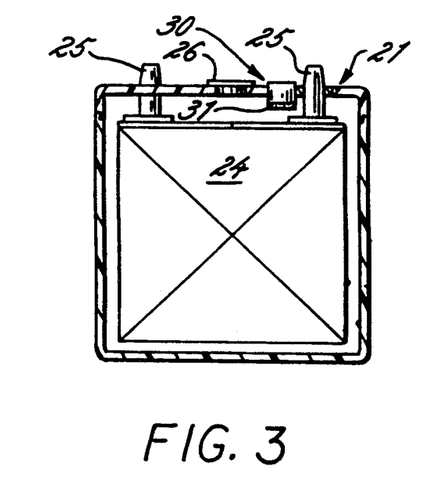
FIG. 3 is a cross-sectional view of a battery with a state of charge indicator.

As shown in more detail in FIG. 2, state of charge indicator 30 comprises a dye system 31 which includes sulfuric acid and a dye absorbed into or onto a support material. The dye system is sensitive to the acid concentration of the battery in that it is one color at a low acid concentration and a different color at high acid concentration. In order to prevent leaching of the dye during use, the dye is preferably chemically bonded to the support material. So that the indicator 30 may monitor changes due to chemical reactions incident to the charge or discharge of the battery, the indicator is mounted so that the dye system 31, as shown in FIGS. 1 and 3, is positioned on the inside of the battery 21, in a space above the level of the electrolyte. In this way, the acid confined within the indicator 30 will reach equilibrium with the acid concentration in the electrolyte, resulting in a unique and predictable dye color that can be correlated to the concentration of the electrolyte in the cell. As the cell cycles, the color of the dye in the dye system 31 changes as the acid concentration in the electrolyte changes. The state of charge of the cell may then be determined by the change in the color of the dye with reference to a suitable index.

Figure 4:
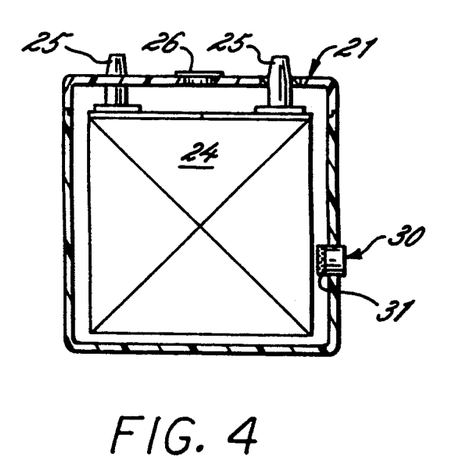
FIG. 4 is a cross-sectional view of a battery, similar to FIG. 3, showing the state of charge indicator in an alternate location.
Figures 5, 6, 7, 8:
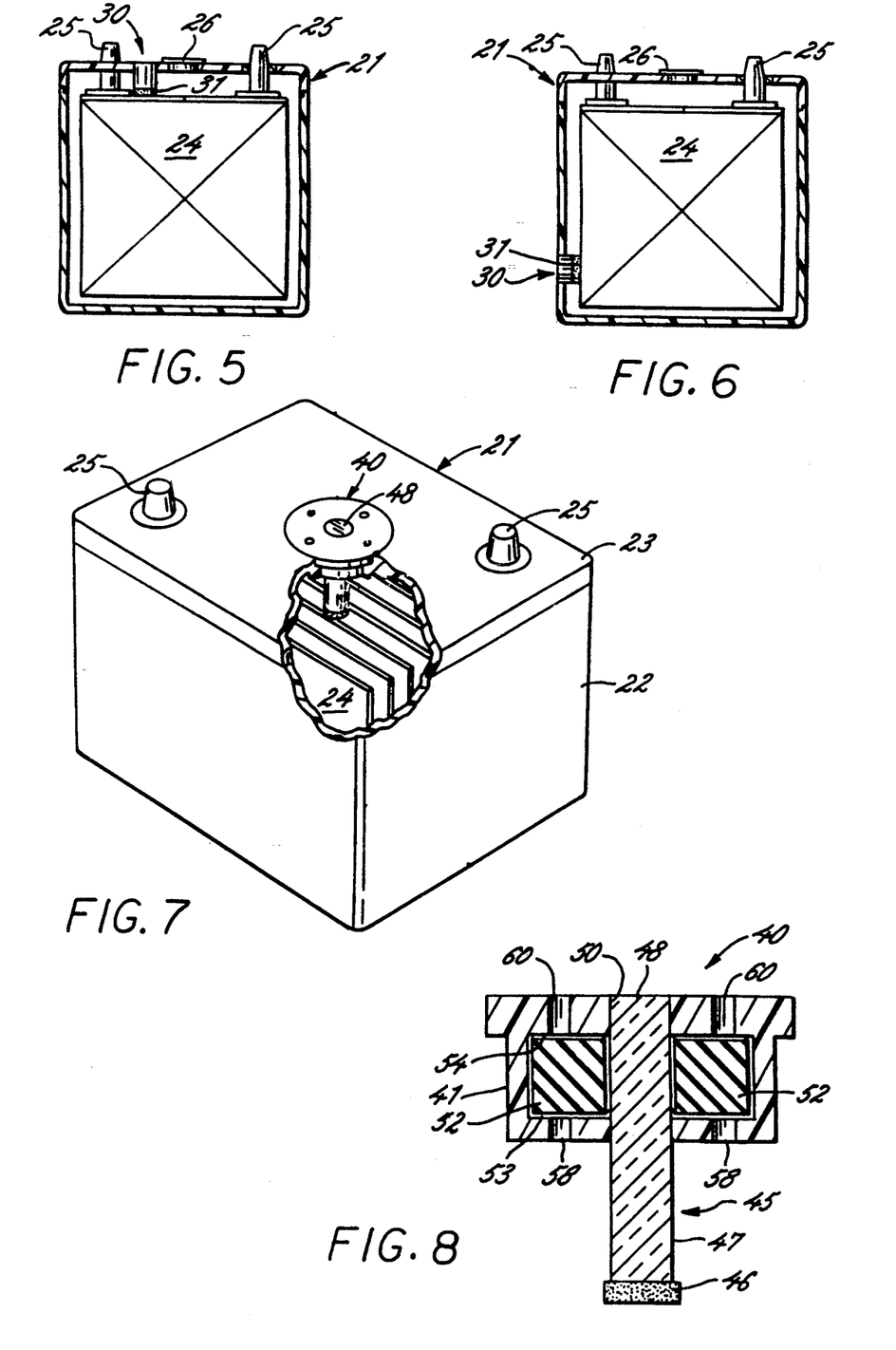
FIG. 5 is a cross-sectional view of a battery similar to FIG. 3 showing the state of charge indicator in a further location in the battery container.
FIG. 6 is a cross-sectional view of a battery similar to FIG. 3 showing the state of charge indicator located in the side of the battery container.
FIG. 7 is a cut away perspective view, similar to FIG. 1, of a battery illustrating a combination state of charge indicator/vent cap according to the present invention.
FIG. 8 is a cross-sectional view of the combination state of charge indicator/vent cap shown in FIG. 7.

It is an important feature of the invention that the indicator 30 may be located, as shown in FIGS. 4, 5 and 6, so that the dye system 31 will be in direct contact with the electrolyte. Because the acid concentration in the indicator system of the present invention will come to equilibrium with the acid concentration within the electrolyte, the indicator can be positioned at any number of convenient locations in the cover or the walls of the battery container. Side wall and end wall mountings are particularly suitable for many industrial applications, while cover mountings are more frequently used in automotive starting, lighting and ignition (SLI) applications. In either location, the indicator is preferably mounted so that the indicator is flush with the adjacent surface. When the indicator is mounted in this way, the indicator appears to be an integral part of the battery, and is protected from accidental damage.

Various types of organic dyes which undergo reversible chemical reactions evidenced by a color change in response to a change in the acid concentration of the electrolyte may be used in the dye system of the state of charge indicator 30. For example, pH sensitive dye compounds such as methyl violet 2B, malachite green, and crystal violet may be used. Alternatively, one or more of the dyes may be combined to result in more distinctive color changes between charged and discharged states. Whatman pH paper, type CF, which is itself a color bonded dye system, with a pH range of 0 to 14, may also be used. Dyes which change color at high acid concentrations may also be utilized; these dyes, which undergo reaction in the one to five molar range of concentration, could more properly be considered activity indicators rather than pH indicators. Further, compounds which are sensitive to specific ions such as $SO_4^-$ may be used.

Various materials that do not decompose in sulfuric acid may be used to support the dye. For example, the indicator may be constructed using a microfiberglass mat, polypropylene irradiated film or other porous substrate with high surface area. Indicators utilizing some substrates are more suitable for use under specified operating conditions than others. For example, an irradiated film displays substantially the same color and is suitable for use in either sealed batteries or batteries with excess electrolyte. Alternately, a microfiberglass substrate alone is suitable for use in sealed conditions rather than flooded conditions.

In order to determine the state of charge of the battery, the observed color is compared to a reference scale showing the range of colors and the corresponding state of charge of the battery. The reference scale will be specific to the dye and substrate used, as well as the battery type in which the indicator is located. The substrate utilized may affect the tone or intensity of the displayed color. An irradiated film generally results in dark casts to the colors, while the white material of a microfiberglass substrate often results in lighter colorations.

The following chart shows an example of color changes and corresponding change in acid specific gravity for an indicator utilizing an impregnated irradiated film in an excess electrolyte condition. An increase in the specific gravity of the acid indicates an increase in the acid concentration.

| Acid Specific Gravity | Malachite Green | Methyl Violet 2B |
| --- | --- | --- |
| 1.170 | purple-gray | blue |
| 1.225 | red-tan | blue-violet |
| 1.310 | dark green | dark green |

The same dyes may display different tones or intensities when supported by an alternate substrate. Thus, when a battery is in a starved electrolyte condition, malachite green indicator on a white microfiberglass substrate displays a pale light yellow color when the battery is in a discharged state, and a reddish color when the battery is in a charged state.

So that color changes in the dye may be observed from the exterior of the battery, the dye system 31 may be affixed to the inside surface of a battery container or cover made of a clear or transparent glass or plastic, or adjacent a clear section of an otherwise opaque container or cover. Alternatively, the dye system 31 may be mounted at one end of a mounting device, such as a transparent rod 32, as shown in FIGS. 1 and 2. The rod 32 is, in turn, mounted through an opening in the container 22 or cover 23. In this way, one end of the rod 32 may be positioned through an opening in the container 22 or cover 23 to form a polished viewport 33. Those skilled in the art will appreciate, however, that the mounting device need not be shaped as a rod. Other geometric shapes, such as cones and frustrums, may also be used.

In order to prevent leakage of the electrolyte, the transparent rod 32 of the indicating device is preferably sealed to the cover 33 or container 22 at the interface by adhesives or ultrasonic welding, although a leak proof seal can also be effected by friction or threaded couplings. The pH sensitive dye system 31 may be attached to the transparent rod 32 by any suitable means, such as by gluing or ultrasonic welding. When the indicator is properly assembled and installed, light from outside the battery 21 is reflected through viewport 33 and rod 32 to the dye system 31. The color of the dye system 31 is therefore observable through the viewport 33, from the exterior surface of the battery 21.

Because the invention is not position sensitive, it may be mounted at various locations in the battery 21 as may be convenient. For example, the indicator 30 may be positioned in the battery cover 23, as shown in FIG. 3, and, in this position, will respond to changes in the concentration of acid confined within the cell elements by way of an exchange of moisture with the vapor above the electrolyte. Alternatively, the indicator 30 may be located in a wall of the container 22 as shown in FIG. 4 and, in this position, will respond directly to changes in the acid concentration of the electrolyte. In addition, the indicator 30 may be placed directly against or in the electrode stacks as shown in FIGS. 5 and 6.

In accordance with a further aspect of the invention, the state of charge indicator can be fabricated in combination with other battery components. In the alternative embodiment shown in FIG. 7, the state of charge indicator is formed as an integral unit 40 with a battery fill and pressure relief cap. The unit 40 thus provides an opening that may be used for filling the individual battery cells with liquid electrolyte during activation, and for maintaining the electrolyte at an appropriate level thereafter. In addition, the unit 40 includes a pressure relief cap, for use in certain starved, sealed cells, which maintains the optimum pressure for a recombination reaction and provides for release of internal gas when the pressure exceeds a predetermined level. The unit 40 therefore maintains a predetermined pressure in the battery, which results in the oxygen recombination. The vent cap, however, does not permit atmospheric oxygen ingress into the cell.

As shown in more detail in FIG. 8, the unit 40 includes a housing 41, a pressure relief valve system, and a state of charge indicator 45. The indicator includes a pH sensitive dye system 46 attached to transparent rod 47 located in the interior of the battery 21. Changes in the color of the dye system 46 may be observed through the viewport 48 at one end of the transparent rod 47.

In order to receive the transparent rod 47 of the state of charge indicator 45, the housing 41 is provided with a central opening 50. The housing 41 further provides a pressure release valve system which includes a confined flexible pressure release gasket or O-ring 52. The gasket 52 surrounds the transparent rod 47 and is seated in an annular chamber in the housing 41 and is held in compression within the annular chamber by surfaces 53 and 54. In addition to the flexible gasket 52, the valve system includes a first set of pressure relief vents 58, which extend through the surface 53 and communicate with the interior of the battery 21. A second set of relief vents 60 extends through surface 54 to the upper portion of the housing 41, where the vents 60 are vented to atmosphere.

When the pressure inside the cell exceeds a predetermined level, the valve system permits the release of excess gas to the atmosphere. Those skilled in the art will appreciate that the internal pressure at which gas is expelled from the battery may be increased or decreased by changing the compressive forces acting on the gasket. The high pressure gas, when released, flows from the interior of the battery through the first set of relief vents 58, around the gasket 52, and is expelled through the second set of pressure relief vents 60. When the internal pressure is less than the predetermined level, the flexible gasket 52 prevents gases contained within the battery from flowing through the pressure relief vents 58 so that an equilibrium vapor pressure is maintained within the battery container. The relief valve will therefore remain closed when gases in the battery container are depleted, even if a vacuum is formed therewithin. By thus preventing atmospheric oxygen from entering the battery, the valve prevents the discharge of the negative electrodes by oxidation. The valve can also be set to maintain the ideal pressure for the oxygen recombination reaction to prevent the loss of water from the electrolyte in the event of an overcharge.

While this invention has been disclosed primarily in terms of specific embodiments thereof, it is not intended to be limited thereto. Other modifications and embodiments of unit 40 will be apparent to those skilled in the art. For example, the valve system may utilize more than one gasket, or employ a spring type pressure relief mechanism, or contain a flash arrestor, without departing from the spirit of the present invention. The transparent rod 47 can also be configured in different shapes, as was previously described in connection with the state of charge indicator 30. Moreover, the unit 40 may be constructed of either plastics or metals, so long as the construction does not deteriorate in the presence of sulphuric acid or other electrolyte. Those skilled in the art will also appreciate that while the invention is described primarily in the context of a lead-acid, multi-cell electric storage battery having conventional electrochemical components, other configurations could also be employed.

We claim as our invention:

1. An electric storage battery comprising a container and a cover, said container and cover having a plurality of walls for enclosing the electrolyte and other electrochemical components of said battery, said electrochemical components comprising positive plates including lead dioxide ($PbO_2$), negative plates including lead (Pb), and said electrolyte including sulfuric acid, said battery further comprising a state of charge indicating device for monitoring the acid concentration of said electrolyte during the charge and discharge cycles of said battery, the indicating device comprising a porous solid support, at least one dye and an acid carried by said support, said dye being sensitive to the concentration of the acid carried by the support, said dye exhibiting a first color in accordance with a first acid concentration, said dye exhibiting a second color in accordance with a second acid concentration, the acid carried by the support exhibiting a change in concentration corresponding to a change in the acid concentration of the electrolyte by an exchange of water, whereby the dye exhibits a change in color in accordance with the change in the concentration of the acid carried by the support as the acid concentration of the electrolyte changes due to a change in the charge of the battery, said indicating device further comprising means in one of said walls for viewing the color of the dye from the exterior of the battery.

2. An electric storage battery comprising a container and a cover, said container and cover having a plurality of walls for enclosing the electrolyte and other electrochemical components of said battery, and a state of charge indicating device for monitoring the acid concentration of said electrolyte during the charge and discharge cycles of said battery, the indicating device comprising a porous solid support, at least one dye and an acid carried by said support, said dye being sensitive to the concentration of the acid carried by the support, said dye exhibiting a first color in accordance with a first acid concentration, said dye exhibiting a second color in accordance with a second acid concentration, the acid carried by the support exhibiting a change in concentration corresponding to a change in the acid concentration of the electrolyte by an exchange of water, whereby the dye exhibits a change in color in accordance with the change in the concentration of the acid carried by the support as the acid concentration of the electrolyte changes due to a change in the charge of the battery, said indicating device further comprising means in one of said walls for viewing the color of the dye from the exterior of the battery, said means for viewing the color of the dye comprising a transparent member mounted in said one of said walls, the solid support being attached to one end of said transparent member, the other end of said transparent member extending through said wall and being in sealing engagement therewith.

3. An electric storage battery comprising a container and a cover, said container and cover having a plurality of walls for enclosing the electrolyte and other electrochemical components of said battery, and a state of charge indicating device for monitoring the acid concentration of said electrolyte during the charge and discharge cycles of said battery, the indicating device comprising a porous solid support, at least one due and an acid carried by said support, said at least one dye being selected from the group consisting of malachite green, methyl violet 2B, and crystal green, said dye being sensitive to the concentration of the acid carried by the support, said dye exhibiting a first color in accordance with a first acid concentration, said dye exhibiting a second color in accordance with a second acid concentration, the acid carried by the support exhibiting a change in concentration corresponding to a change in the acid concentration of the electrolyte by an exchange of water, whereby the dye exhibits a change in color in accordance with the change in the concentration of the acid carried by the support as the acid concentration of the electrolyte changes due to a change in the charge of the battery, said indicating device further comprising means in one of said walls for viewing the color of the dye from the exterior of the battery.

4. An electric storage battery comprising a container and a cover, said container and cover having a plurality of walls for enclosing the electrolyte and other electrochemical components of said battery, and a state of charge indicating device for monitoring the acid concentration of said electrolyte during the charge and discharge cycles of said battery, the indicating device comprising a porous solid support, at least one dye and an acid carried by said support, the porous solid support being selected from the group consisting of glass microfilter mat and polypropylene irradiated film, said dye being sensitive to the concentration of the acid carried by the support, said dye exhibiting a first color in accordance with a first acid concentration, said dye exhibiting a second color in accordance with a second acid concentration, the acid carried by the support exhibiting a change in concentration corresponding to a change in the acid concentration of the electrolyte by an exchange of water, whereby the dye exhibits a change in color in accordance with the change in the concentration of the acid carried by the support as the acid concentration of the electrolyte changes due to a change in the charge of the battery, said indicating device further comprising means in one of said walls for viewing the color of the dye from the exterior of the battery.

5. An electric storage battery comprising a container and a cover, said container and cover having a plurality of walls for enclosing the electrolyte and other electrochemical components of said battery, and a state of charge indicating device for monitoring the acid concentration of said electrolyte during the charge and discharge cycles of said battery, the indicating device being removable to allow access to the interior of said battery, the indicating device comprising a porous solid support, at least one dye and an acid carried by said support, said dye being sensitive to the concentration of the acid carried by the support, said dye exhibiting a first color in accordance with a first acid concentration, said dye exhibiting a second color in accordance with a second acid concentration, the acid carried by the support exhibiting a change in concentration corresponding to a change in the acid concentration of the electrolyte by an exchange of water, whereby the dye exhibits a change in color in accordance with the change in the concentration of the acid carried by the support as the acid concentration of the electrolyte changes due to a change in the charge of the battery, said indicating device further comprising means in one of said walls for viewing the color of the dye from the exterior of the battery.

6. A battery and indicating device combination as claimed in claim 1 wherein the battery utilizes an immobilized electrolyte system.

7. A battery and indicating device combination as claimed in claim 2 wherein said transparent member is a plastic rod.

8. A battery and indicating device combination as claimed in claim 2 wherein the dye is malachite green.

9. A battery and indicating device combination as claimed in claim 2 wherein the dye is methyl violet 2B.

10. A battery and indicating device combination as claimed in claim 2 wherein the dye is crystal violet.

11. A battery and indicating device combination as claimed in claim 2 wherein the porous solid support is a glass microfiber mat.

12. A battery and indicting device combination as claimed in claim 2 wherein the porous solid support is a polypropylene irradiated film.

13. The battery and indicating device combination of claim 5 wherein the indicating device is mounted in a housing, the housing and the indicating device being removable to allow access to the interior of the battery.

14. The battery and indicating device combination of claim 13 wherein said housing comprises a pressure relief device.

15. The battery and indicating device as claimed in claim 14 wherein said housing defines at least one chamber for seating at least one flexible gasket therewithin, said housing having at least one pressure relief vent permitting gaseous communication from the interior of said battery to said chamber, and at least one pressure relief vent permitting gaseous communication from said chamber to the atmosphere.

16. The battery and indicating device combination of claim 15 in which said flexible gasket is captivated and held in compression against said relief vents in said chamber such that gas is released from the interior of said battery through said relief vents only when the pressure of said gas exceeds a level determined by the compression of said gasket.

17. The battery and indicating device combination as claimed in claim 5 wherein said means for viewing the color of the dye comprises a transparent member.

18. The battery and indicating device combination as claimed in claim 17 wherein the porous solid support is attached to one end of the transparent member and the other end of the transparent member extends through one of said walls.

19. The battery and indicating device combination of claim 18 wherein the transparent member is a plastic rod.

20. The battery and indicating device combination is claimed in claim 13 wherein the means for viewing the color of the dye is a transparent member, said transparent member being mounted in the housing.

21. The battery and indicating device combination of claim 20 wherein the solid support is attached to one end of the transparent member, and the other end of the transparent member extends through the housing and is in sealing engagement therewith.

22. The battery and indicating device combination of claim 21 wherein the transparent member is a plastic rod.

23. The battery and indicating device combination of claim 14 the means for viewing the color of the dye is the transparent member, said transparent member being mounted in the housing.

24. The battery and indicating device combination of claim 15 wherein the means for viewing the color of the dye comprises a transparent member mounted in the housing, the solid support being attached to one end of the transparent member, the other end of the transparent member extending through the housing and being in sealing engagement therewith.

25. The battery and indicating device combination of claim 24 wherein the transparent member is a plastic rod.

26. The battery and indicating device combination of claim 24 wherein the chamber for seating the gasket is circular and the flexible gasket is ring shaped, and said transparent member extends through the chamber and said flexible gasket is seated around the transparent member.

27. The battery and indicating device combination of claim 14 wherein the pressure relief device comprises a spring type pressure relief mechanism.

* * * * *

UNITED STATES PATENT AND TRADEMARK OFFICE
CERTIFICATE OF CORRECTION

PATENT NO. : 5,132,176

DATED : July 21, 1992

INVENTOR(S) : THEODORE W. VALENTINE, ALLEN F. FIEDLER, JOSEPH SZYMBORSKI AND MARK L. EGGERS

It is certified that error appears in the above-identified patent and that said Letters Patent is hereby corrected as shown below:

TITLE PAGE

[56]    References Cited:

U.S. PATENT DOCUMENTS

| Number | Date | Name |
|---|---|---|
| 1,017,064 | 02/13/12 | Smith et al. |
| 1,497,388 | 06/10/24 | Sterling |
| 1,583,648 | 05/04/26 | Benner |
| 1,796,379 | 03/17/31 | Linebarger |
| 2,000,668 | 05/07/35 | Pease |
| 2,053,353 | 09/08/36 | Talbot |
| 2,288,984 | 07/07/42 | Willits |
| 2,315,758 | 04/06/43 | Willits |
| 2,400,228 | 05/14/46 | Franz et al. |
| 2,631,183 | 03/10/53 | Babis |
| 2,980,754 | 04/18/61 | Reilly et al. |
| 3,093,516 | 06/11/63 | Hennen et al. |
| 3,383,917 | 05/21/68 | Ryder et al. |
| 3,445,291 | 05/20/69 | Stein |
| 3,563,806 | 02/16/71 | Hruden |
| 3,615,868 | 10/26/71 | Melone |
| 3,664,879 | 05/23/72 | Olsson |
| 3,764,893 | 10/09/73 | Weigand |
| 3,862,861 | 01/28/75 | McClelland et al. |
| 3,895,964 | 07/22/75 | Sakamoto |

UNITED STATES PATENT AND TRADEMARK OFFICE
CERTIFICATE OF CORRECTION

Page 2 of 3

PATENT NO. : 5,132,176
DATED : July 21, 1992
INVENTOR(S) : THEODORE W. VALENTINE, ALLEN F. FIEDLER, JOSEPH SZYMBORSKI AND MARK L. EGGERS It is certified that error appears in the above-identified patent and that said Letters Patent is hereby corrected as shown below:

TITLE PAGE

[56]   References Cited:

U.S. PATENT DOCUMENTS

| | | |
|---|---|---|
| 3,915,753 | 10/28/75 | Melone |
| 3,992,228 | 11/16/76 | Depoix |
| 4,203,065 | 05/13/80 | Whitford |
| 4,308,817 | 01/05/82 | Peterson |
| 4,497,881 | 02/05/85 | Bertolino |
| 4,587,923 | 05/13/86 | Mejia |

FOREIGN PATENT DOCUMENTS

| | | |
|---|---|---|
| 46-28735 | 08/20/71 | Japan |
| 54-60425 | 05/15/79 | Japan |
| 55-53075 | 04/18/80 | Japan |
| 56-11859 | 02/05/81 | Japan |
| 59-16283 | 01/01/84 | Japan |
| 110,263 | 10/11/60 | Pakistan |
| 242-273 | 12/24/62 | Australia |
| 528,077 | 10/22/40 | Great Britain |
| 1,437,752 | 06/03/76 | Great Britain |
| 2,346,115 | 04/17/75 | Fed. Rep. of Germany |

UNITED STATES PATENT AND TRADEMARK OFFICE
CERTIFICATE OF CORRECTION

PATENT NO. : 5,132,176

DATED : July 21, 1992

INVENTOR(S) : THEODORE W. VALENTINE, ALLEN F. FIEDLER, JOSEPH SZYMBORSKI AND MARK L. EGGERS

It is certified that error appears in the above-identified patent and that said Letters Patent is hereby corrected as shown below:

Column 3, line 67, delete "propored" and substitute therefor -- proposed --; and Column 4, line 57, delete "," after the word "to".

Column 9, line 28, delete "due" and substitute therefor -- dye --;

Column 9, lines 56-57, delete "micro-filter" and substitute therefor -- microfiber --; and Column 12, line 5, add "wherein" after "14".

Signed and Sealed this

Seventh Day of March, 1995

Attest:

BRUCE LEHMAN

Attesting Officer

Commissioner of Patents and Trademarks